May 17, 1932. S. ROKOSZ 1,859,172
WING OPERATING MECHANISM FOR AIRCRAFT
Filed June 20, 1931 4 Sheets-Sheet 3

Stanley Rokosz, INVENTOR
BY Victor J. Evans
and Co. ATTORNEY

May 17, 1932. S. ROKOSZ 1,859,172
WING OPERATING MECHANISM FOR AIRCRAFT
Filed June 20, 1931 4 Sheets-Sheet 4
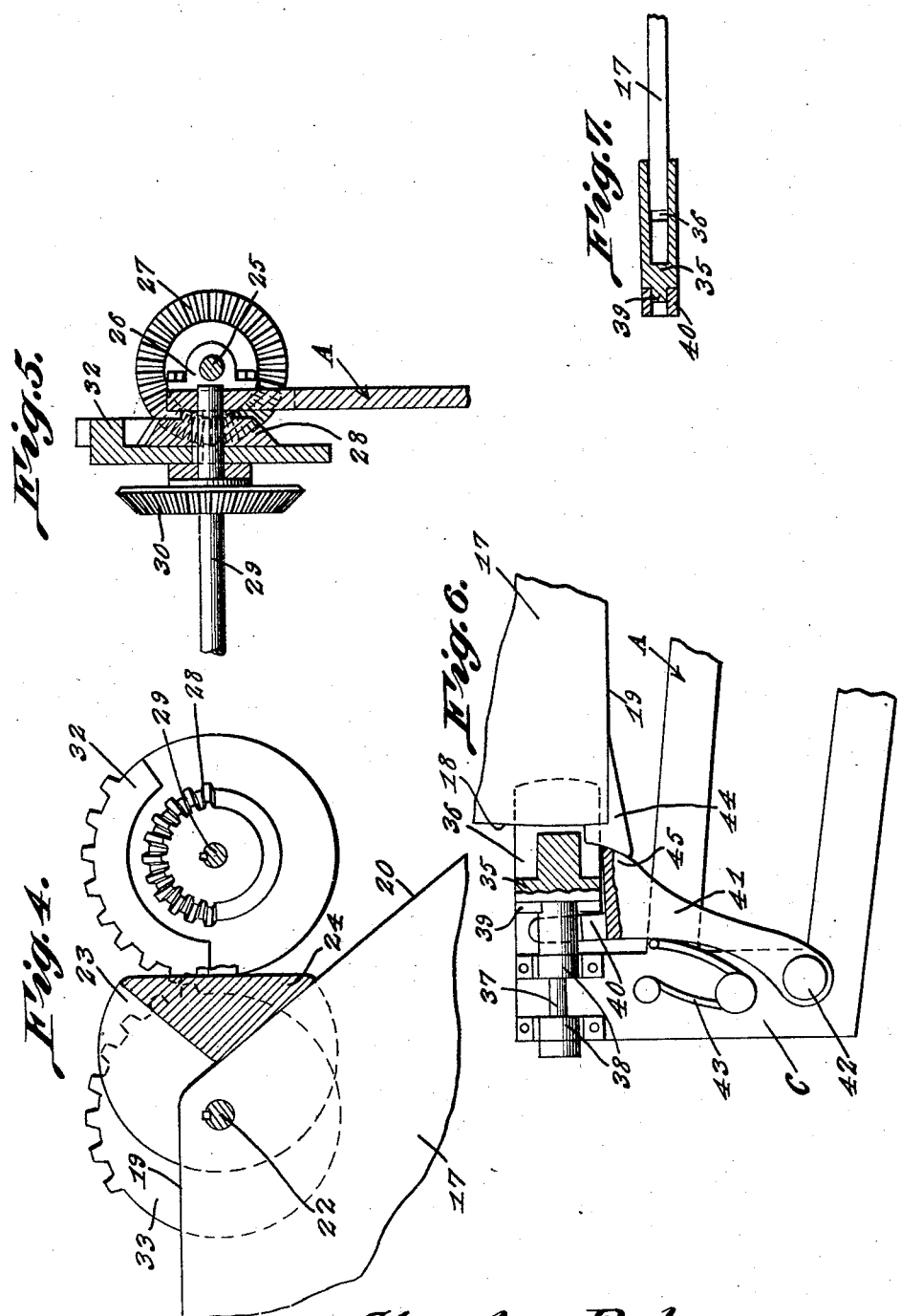
Stanley Rokosz, INVENTOR
BY Victor J. Evans
and Co. ATTORNEY Patented May 17, 1932

1,859,172

UNITED STATES PATENT OFFICE

STANLEY ROKOSZ, OF HAZLETON, PENNSYLVANIA

WING OPERATING MECHANISM FOR AIRCRAFT

Application filed June 20, 1931. Serial No. 545,803.

The invention relates to wing operating mechanism for aircrafts and more especially to an aircraft construction operative on the helicopter principles.

The primary object of the invention is the provision of mechanism of this character wherein the wings of the aircraft are so constructed and arranged that the same will be moved arcuately edgewise in a vertical path and laterally to simulate the flapping of the wings of a bird and in this manner a quick take-off in a substantially vertical or perpendicular path may be had and likewise a corresponding landing and such craft sustained in flight for any desired directional travel thereof.

Another object of the invention is the provision of mechanism of this character, wherein the wings are of novel form and are supported for movements in a novel manner and also are operated in a novel fashion so that these wings can be shifted vertically edgewise and swung laterally for a flapping action, the movements of the wings being continuous and the operation thereof had from the motor of the aircraft.

A further object of the invention is the provision of mechanism of this character, which in its assembly assures positive action and includes comparatively few parts and in operation will enable a graceful and quick take-off and landing as well as air travel when the craft is in flight.

A still further object of the invention is the provision of mechanism of this character which is comparatively simple in construction, the craft being unique in appearance, strong, durable, such mechanism being thoroughly reliable and efficient in operation, and inexpensive to manufacture and install.

With these and other objects in view, the invention consists in the features of construction, combination and arrangement of parts as will be hereinafter more fully described in detail, illustrated in the accompanying drawings, which disclose the preferred embodiment of the invention, and pointed out in the claims hereunto appended.

In the accompanying drawings:—

Figure 4 is a fragmentary enlarged sectional view taken on the line 4—4 of Figure 2 looking in the direction of the arrows.

Figure 2:
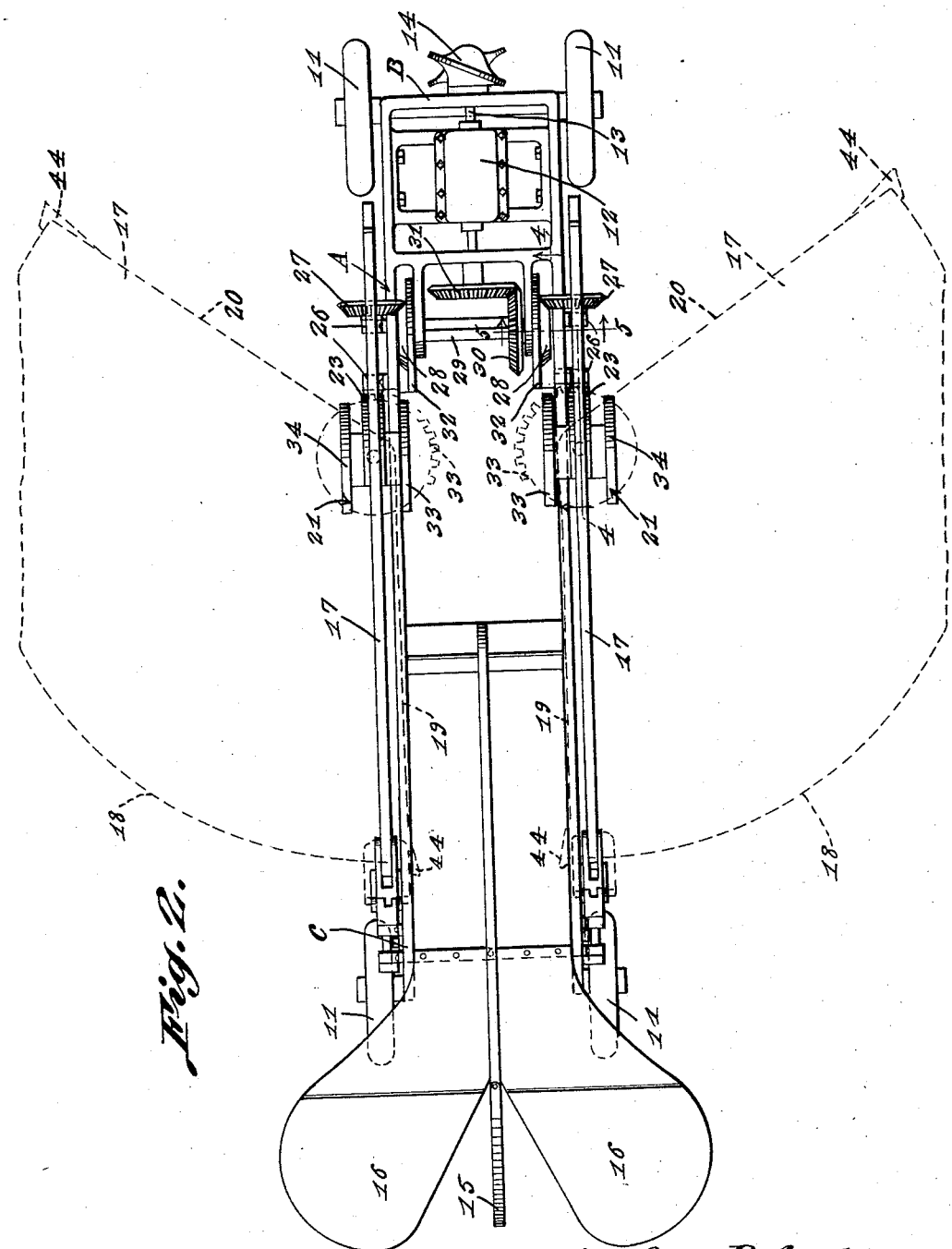
Figure 2 is a top plan view of the craft showing by full lines the vertical disposition of the wings and by dotted lines the lateral spread of said wings.
Figure 3:
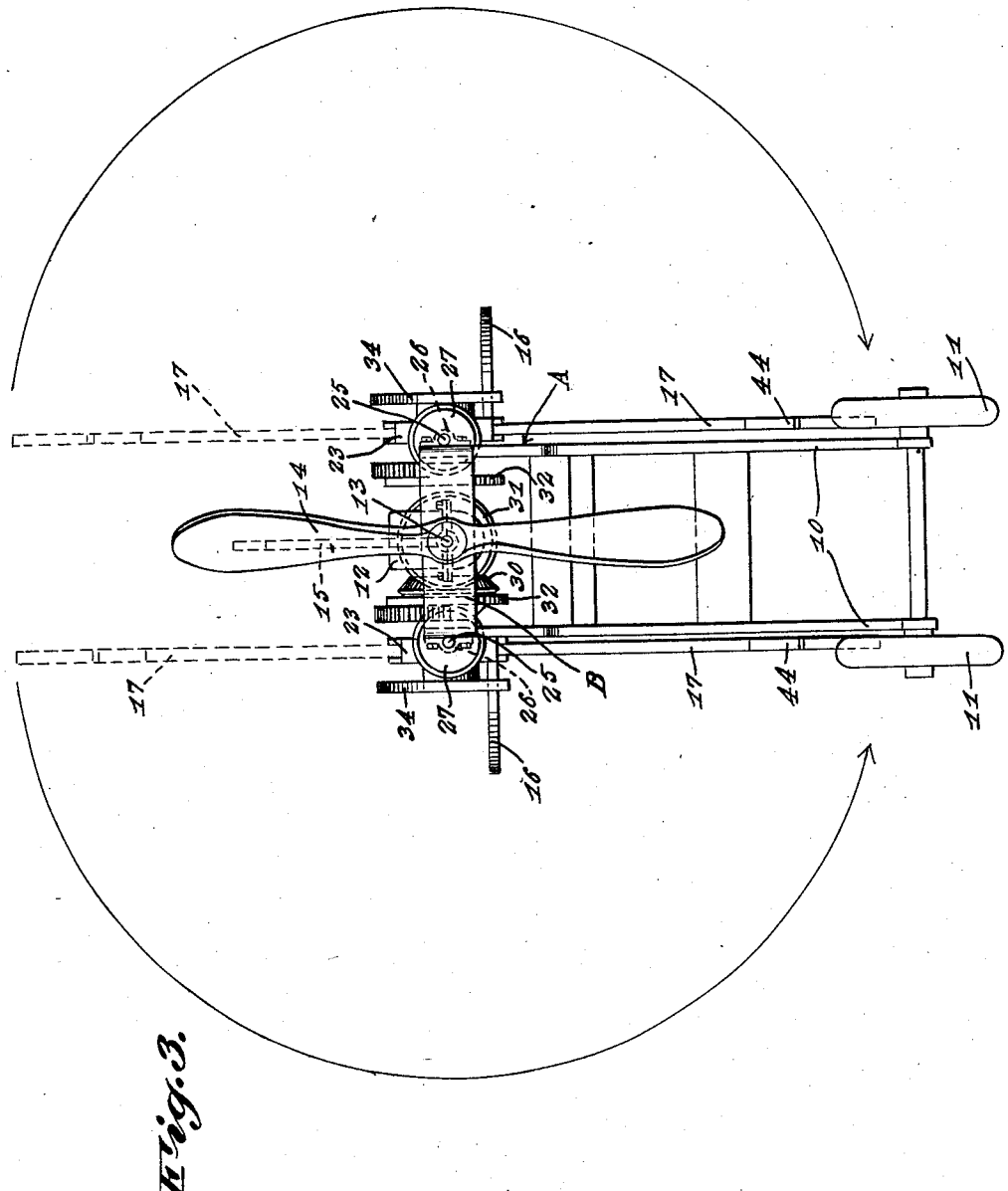
Figure 3 is a front elevation showing the wings in vertical position both by full and dotted lines and by arrows the lateral swinging course of said wings.

Fgure 5 is a fragmentary detail sectional view taken on the line 5—5 of Figure 2 looking in the direction of the arrows.

Figure 6 is an enlarged fragmentary elevation partly in section showing in detail the trip latching dog or pawl and the companion wing tripper therefor.

Figure 1:
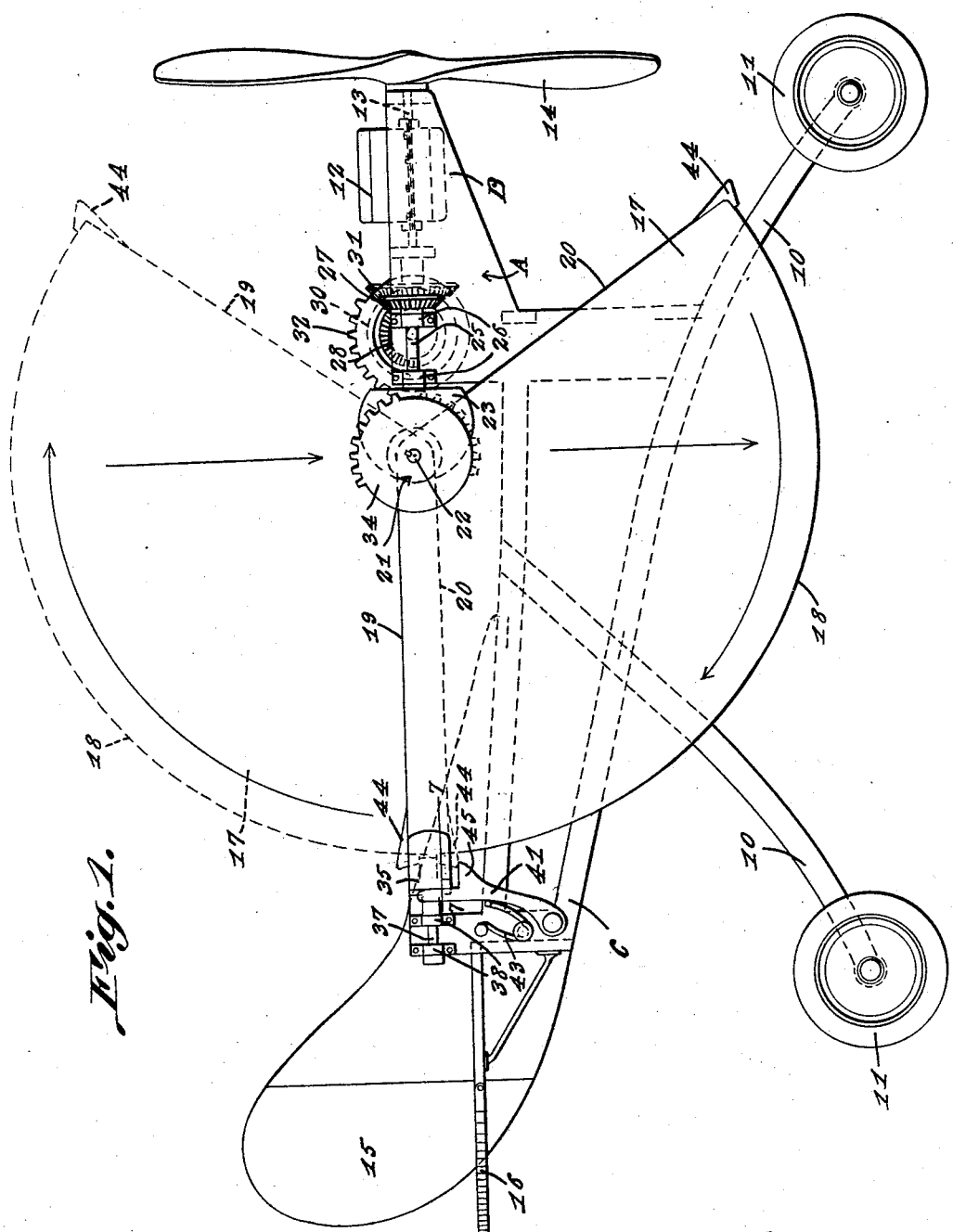
Figure 1 is a side elevation of the aircraft with the mechanism constructed in accordance with the invention, the path of movement of the wings being indicated by arrows, both edge arcuate movements and lateral swinging movements, the wings being shown by full lines in lowermost position and by dotted lines in elevated or raised position.

Figure 7 is a fragmentary sectional view on the line 7—7 of Figure 1.

Similar reference characters indicate corresponding parts throughout the several views in the drawings.

Referring to the drawings in detail, the aircraft comprises a frame A which is preferably of skeleton design including a fore extension or nose B and a rear extension C, while depending from and curved forwardly and rearwardly is a landing gear 10 having ground wheels 11 journaled therein and this landing gear may be either as shown in Figure 1 of the drawings or otherwise constructed to give the proper elevation to the frame A when supported upon a foundation or ground.

Fitted within the fore extension B is a motor 12 of any desirable type and its power shaft 13 is extended forwardly and carries thereon a bladed propeller 14 outside of the fore extension B and this propeller may be of any desirable kind, while mounted on the rear extension C are the vertical and horizontal rudders 15 and 16 respectively, these being of any desirable type and are controlled in any suitable manner. Likewise the motor 12 is controllable in any fashion or accordingly to the taste of the builder of the craft.

Located at opposite sides of the frame A are wings 17, these being of segmental form each having a rounded edge 18 and straight edges 19 and 20 respectively which are disposed at an angle to each other and said wings 17 are operable through the medium of mechanism hereinafter fully described.

Each wing 17 is mounted for swinging movements and is carried in a turning head 21 and is supported for edgewise arcuate movement upon an axle 22, the latter being journaled in said head 21, the head being formed with a guideway 23 therein and an abutment 24 confronting the same, the guideway permitting the sweep of the wing 17 when the axle 22 is operated for the arcuate movement of said wing edgewise. The abutments 24 in the guideway 23 of the head 21 serve to limit the arcuate edgewise movement of the wing 17 when automatically operated.

Each head 21 is carried on a turning stud shaft 25 journaled in bearings 26, these being mounted on the sides of the frame A. The stud shafts 25 have fixed thereto beveled gears 27, these meshing with companion gears 28 keyed to a countershaft 29 journaled transversely of the frame A, which shaft through the medium of gears 30 and 31 respectively is driven from the power shaft 13 of the motor 12 so that power from said motor will be transmitted through said gears to the countershaft 29 for operating the wings 17.

The countershaft 29 has fixed thereto segmental gears 32, these meshing intermittently with companion segmental gears 33 and 34 respectively keyed or splined to the axles 22 in the heads 21. It will be noted that there is a pair of these segmental gears 33 and 34 for each head 21 and the same are arranged on opposite sides thereof. Thus it will be apparent that when motion is transmitted to either of the gears 33 or 34 of the pair the wings 17 will be caused to arcuately move edgewise in a vertical direction, so that in the disposition of this gear mechanism and the timing thereof the said wings 17 will be successively swung arcuately edgewise vertically and laterally to produce a flapping action simulating the wings of a bird and in this manner the aircraft effects a take-off, landing and air travel.

The wings 17 in their arcuate edge movement are adapted to travel in edge guide heads 35, each having a guide-way 36 therein and are carried by turning stud shafts 37 journaled horizontally in bearings 38 mounted on the rear extension 19 at the outer sides of the frame A. The heads 35 each are formed with a latching tongue 39 which is engageable in a latching fork 40 formed on a tripping pawl or dog 41 pivoted at 42 to the rear extension 19 exteriorly thereof, the pawl or dog 41 being tensioned by a spring 43 active against the same. The head 35 is latched by the fork 40 when the coacting wing 17 with said head is disposed perpendicular or vertically so as to hold this position of the wing to permit arcuate edgewise swing thereof as hereinbefore described.

Each wing 17 at the outer corners thereof is formed with tripping projections 44 which are designed to coact with the toe extension 45 on the pawl or dog 41 for the automatic trip thereof to release the latching fork from the latching tongue 39 of the head 34 when the wing 17 arcuately moves edgewise in a vertical direction so that the wing when released by the head 33 can be swung laterally and in this manner a flapping action of the wing is attained.

Normally the wings 17 are disposed perpendicular or vertically at opposite sides of the frame A and when the motor 12 is started the said wings will be caused to swing arcuately edgewise in a vertical direction in accordance with the curved arrows shown in Figure 1 of the drawings, so as to carry the wings 17 from lowermost points of a circle to the topmost points thereof, whence the heads 35 will be automatically released and such wings will be swung laterally with respect to the frame A and this trend of operation is continuous with the resultant flapping action of the wings for the take-off of the aircraft, the landing and air travel thereof.

The arcuate edgewise movements of the wings 17 in both lowermost and uppermost positions vertically are limited by the stops 24 in the heads 21, these bracing and steadying the wings combined with the formation of the heads 21 which present spaced side sheets to the guideways 23 therein as will be clearly apparent in Figure 4 of the drawings.

It is of course to be understood that the controls for the motor, rudders and other controllable parts of the machine may be of any selected type and under the election of the builder of the craft.

It is contemplated to make changes, variations and modifications in the mechanism, particularly details thereof as may come properly within the scope of the appended claims without departing from the spirit of the invention or sacrificing any of its advantages.

What is claimed is:—

1. In an aircraft having opposed wings, of mechanism coacting with the wings to move the same arcuately in a vertical direction edgewise and also for laterally swinging said wings successively, a propeller, motor means operating the propeller and said mechanism, and means automatically tripped by the wings for locking the same when moving vertically in an arcuate direction edgewise.

2. In an aircraft having opposed wings, of mechanism coacting with the wings to move the same arcuately in a vertical direction edgewise and also for laterally swinging said wings successively, a propeller, motor means operating the propeller and said mechanism, means automatically tripped by the wings for locking the same when moving vertically in an arcuate direction edgewise, a nose extension, a rear extension, and vertical and horizontal rudder mechanism on the rear extension.

In testimony whereof I affix my signature.

STANLEY ROKOSZ.